US009239596B2

(12) United States Patent  (10) Patent No.: US 9,239,596 B2
Lu et al.  (45) Date of Patent: Jan. 19, 2016

(54) PORTABLE ELECTRONIC DEVICE

(71) Applicant: Quanta Computer Inc., Taoyuan Shien (TW)

(72) Inventors: Chia-Fu Lu, Chiayi County (TW); Chih-Hsi Lai, New Taipei (TW); Ming-Chin Ko, Taipei (TW); Chao-Hsien Chan, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 380 days.

(21) Appl. No.: 13/895,808

(22) Filed: May 16, 2013

(65) Prior Publication Data

US 2014/0085792 A1  Mar. 27, 2014

(30) Foreign Application Priority Data

Sep. 24, 2012 (TW) .............................. 101134952 A (51) Int. Cl.
 *G06F 1/16* (2006.01)
(52) U.S. Cl.
 CPC .............. *G06F 1/1662* (2013.01); *G06F 1/162* (2013.01); *G06F 1/1624* (2013.01); *G06F 1/1683* (2013.01)
(58) Field of Classification Search
 CPC ....................................................... G06F 1/16
 USPC ............. 361/679.01–679.45, 679.55–679.61, 361/724–727, 728–747, 752–759, 796–837
 See application file for complete search history.

(56) References Cited

U.S. PATENT DOCUMENTS

| 7,035,090 B2* | 4/2006 | Tanaka | G06F 1/162 345/169 |
| 7,529,571 B2* | 5/2009 | Byun | H04M 1/0237 16/334 |
| 7,677,509 B2* | 3/2010 | Jang | F16M 11/04 248/121 |
| 8,130,122 B2* | 3/2012 | Tseng | G06F 3/0221 341/22 |
| 8,264,828 B2* | 9/2012 | Chang | G06F 1/162 361/679.06 |
| 8,654,520 B2* | 2/2014 | Lin | G06F 1/1624 361/679.02 |

(Continued)

FOREIGN PATENT DOCUMENTS

| CN | 1956643 A | 5/2007 |
| TW | M250349 | 11/2004 |

(Continued)

*Primary Examiner* — Courtney Smith
*Assistant Examiner* — Rashen E Morrison
(74) *Attorney, Agent, or Firm* — Rabin & Berdo, P.C.

(57) ABSTRACT

A portable electronic device includes a lower member, an upper member, a strip-storing unit and an electric connecting strip. The lower member is provided with a keyboard module. The upper member is slidably disposed on the lower member. The strip-storing unit is disposed in the lower member. The electric connecting strip is retractably disposed in the strip-storing unit, and two ends thereof are respectively connected to the upper member and the lower member. When the upper member slides on the lower member, a part of the electric connecting strip is pulled out or pulled back into the strip-storing unit.

8 Claims, 11 Drawing Sheets

(56) References Cited

U.S. PATENT DOCUMENTS

| | | | | |
|---|---|---|---|---|
| 2003/0081375 A1* | 5/2003 | Yamamoto | G06F 1/1624 | 361/679.3 |
| 2004/0057197 A1* | 3/2004 | Hill | G06F 1/1601 | 361/679.06 |
| 2005/0133327 A1* | 6/2005 | Kao | H02G 11/00 | 191/12 R |
| 2006/0030381 A1* | 2/2006 | Byun | H04M 1/0237 | 455/575.4 |
| 2008/0081505 A1* | 4/2008 | Ou | G06F 1/1616 | 439/374 |
| 2008/0174943 A1* | 7/2008 | Hirasawa | G06F 1/1616 | 361/679.27 |
| 2009/0029741 A1* | 1/2009 | Satou | H01Q 1/243 | 455/566 |
| 2009/0247247 A1* | 10/2009 | Jang | H04M 1/0237 | 455/575.4 |
| 2011/0051380 A1* | 3/2011 | Park | H04M 1/0237 | 361/749 |
| 2011/0105204 A1* | 5/2011 | Kouno | H04M 1/0237 | 455/575.4 |
| 2011/0143823 A1* | 6/2011 | Holman, IV | H04M 1/0237 | 455/575.4 |
| 2011/0143825 A1* | 6/2011 | Ahn | H04M 1/026 | 455/575.4 |
| 2012/0077555 A1* | 3/2012 | Jung | G06F 1/1616 | 455/575.4 |
| 2012/0157172 A1* | 6/2012 | Chang | H04M 1/0277 | 455/575.4 |
| 2013/0017867 A1* | 1/2013 | Lee | H01Q 7/06 | 455/566 |
| 2013/0242521 A1* | 9/2013 | Lin | G06F 1/1624 | 361/807 |
| 2014/0085792 A1* | 3/2014 | Lu | G06F 1/1662 | 361/679.08 |

FOREIGN PATENT DOCUMENTS

| | | |
|---|---|---|
| TW | M434422 U1 | 7/2012 |
| TW | M436308 U1 | 8/2012 |

* cited by examiner

PORTABLE ELECTRONIC DEVICE

RELATED APPLICATIONS

This application claims priority to Taiwan Application Serial Number 101134952, filed Sep. 24, 2012, which is herein incorporated by reference.

BACKGROUND

1. Technical Field

The present disclosure relates to a portable electronic device, and more particularly to a portable electronic device capable of hiding a flexible printed circuit thereof.

2. Description of Related Art

In a conventional portable electronic device such as a slider computer, the screen is slidably disposed on the keyboard. As the slider computer in use, the screen is slide to one side of the keyboard exposing a keyboard thereof and upwardly being lifted on the keyboard. However, in sliding the screen of the slider computer to stand on the keyboard, an electric connecting strip (e.g., a flexible printed circuit) for connecting the screen and the keyboard or host would be exposed outside the slider computer, so that the electric connecting strip may have higher possibility of being damaged.

In this regard, how to develop a portable electronic device for solving the mentioned disadvantages is an urgent issue in the art.

SUMMARY

The present disclosure provides a portable electronic device in which when the portable electronic device exposes a keyboard thereof, a part of an electric connecting strip is hidden in the portable electronic device, thereby prevented from being exposed outside the portable electronic device, so the whole appearance can be prettified, and the possibility of the electric connecting strip being damaged can be lowered, the willingness of purchasing and using the portable electronic device is also increased.

According to one embodiment of the present disclosure, the portable electronic device includes a lower member, an upper member, a strip-storing unit and an electric connecting strip. The lower member is provided with a keyboard module being adjacent to one side of the lower member. The upper member is slidably disposed on the lower member, and is provided with a screen. The strip-storing unit is disposed in the lower member and is adjacent to the other side of the lower member. The electric connecting strip is stored in the strip-storing unit with a folding means, and two ends thereof are respectively connected to the upper member and the lower member.

Therefore, when the upper member slides to cover the keyboard module, a part of the electric connecting strip is pulled out of the strip-storing unit; on the other hand, when the upper member slides to expose the keyboard module, the part of the electric connecting strip is pulled back into the strip-storing unit.

BRIEF DESCRIPTION OF THE DRAWINGS

The present disclosure will be apparent to those skilled in the art by reading the following detailed description of a preferred embodiment thereof, with reference to the attached drawings, in which.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The portable electronic device provided by the present disclosure includes a lower member, an upper member, a strip-storing unit and an electric connecting strip. The upper member is slidably disposed on the lower member. The strip-storing unit is disposed in the lower member. Two ends of the electric connecting strip are respectively connected to the upper member and the lower member, and the electric connecting strip is retractably disposed in the storing unit. When the upper member slides relative to the lower member, a part of the electric connecting strip is pulled out or pulled back into the strip-storing unit with the movement of the upper member, thereby preventing overly-long electric connecting strip from being exposed outside the portable electronic device, so the whole appearance can be prettified, and the possibility of the electric connecting strip being damaged can be lowered.

According to the present disclosure, the relative position of the upper member and the lower member is not limited, in other words, the upper member can be disposed below the lower member.

For example, the lower member can be a keyboard device or a display panel. The upper member can be a liquid crystal display (LCD) panel, a touch-control panel or a tablet computer.

Figure 1:
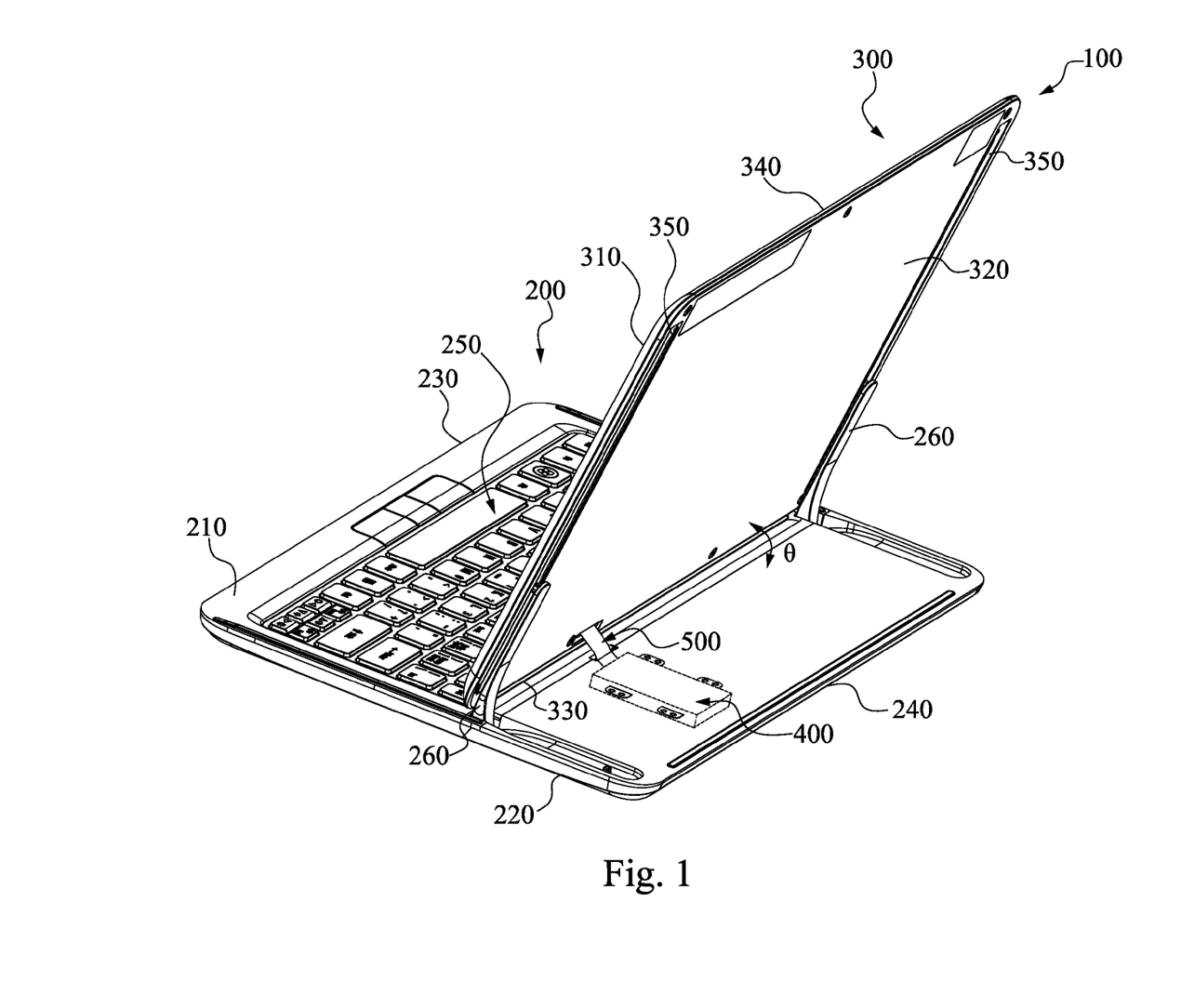
FIG. 1 is a schematic view showing the appearance of the portable electronic device according to an embodiment of the present disclosure.

FIG. 1 is a schematic view showing the appearance of the portable electronic device 100 according to an embodiment of the present disclosure.

According to this embodiment, the portable electronic device 100, for example, is a slider computer. The lower member, for example, is a keyboard device 200. The keyboard device 200 is formed with a first front surface 210 and a first rear surface 220 opposite to the first front surface 210, and a first front side 230 and a first rear side 240 opposite to the first front side 230. The first front side 230 and the first rear side 240 are defined between the first front surface 210 and the first rear surface 220, and adjacent to the first front surface 210 and the first rear surface 220. The first rear surface 220 of the keyboard device 200 is flatly disposed on a placement surface (e.g., a table surface). The keyboard device 200 includes a keyboard module 250 (e.g., a solid keyboard or an induction type keyboard) disposed on the first front surface 210 of the keyboard device 200 and at the location close to the first front side 230, exposed on the first front surface 210 of the keyboard device 200, and equipped with a function similar to the keyboard installed on a notebook computer.

The upper member, for example, is a tablet computer 300 or host. The tablet computer 300 includes a motherboard, a central process unit, a memory unit, a screen (e.g., a touch-control display panel), a hard disk, a battery unit, and plural electronic components for processing commands.

Substantially, the tablet computer 300 is formed in a plate-like shape, and formed with a second front surface 310 and a second rear surface 320 opposite to the second front surface 310, and a second front side 330 and a second rear side 340 opposite to the second front side 330. The second front side 330 and the second rear side 340 are respectively defined between the second front surface 310 and the second rear surface 320, and adjacent to the second front surface 310 and the second rear surface 320. The tablet computer 300 is slidably disposed on the first front surface 210 of the keyboard device 200, and the screen (not shown in figures) is disposed on the second front surface 310 of the tablet computer 300.

Figure 3A:
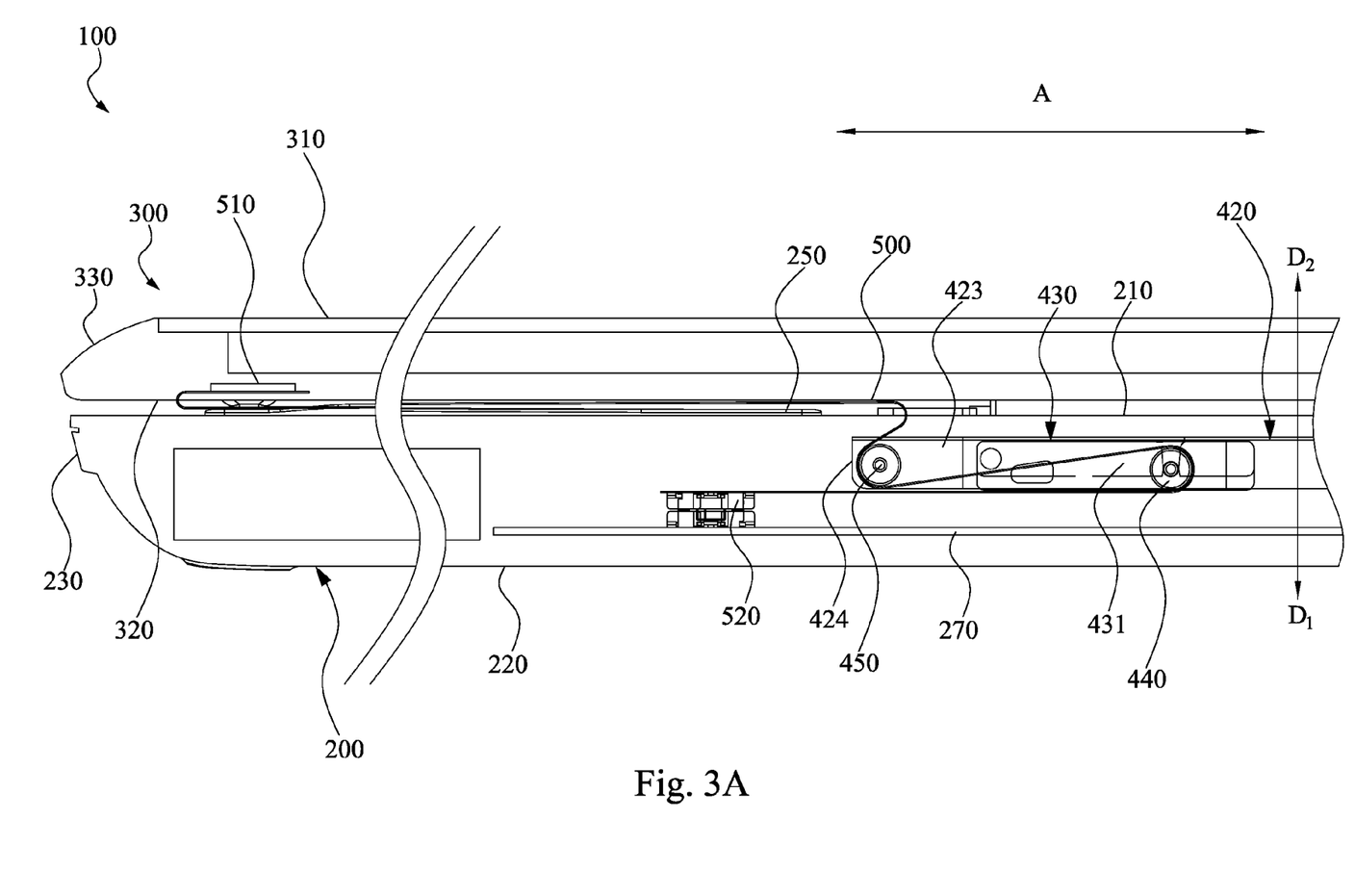
FIG. 3A is a partial side view showing the portable electronic device being in a screen mode according to the first alternative of this embodiment.

According to this embodiment, the tablet computer 300 includes two slide rails 350. The two side rails 350 are respectively fixed at two opposite sides of the second rear surface 320 of the tablet computer 300, and each of the slide rails 350 is extended from the second front side 330 of the tablet computer 300 to the second rear side 340. The keyboard device 200 includes two support sheets 260. The support sheets 260 are respectively pivoted at two opposite sides of the first front surface 210 of the keyboard device 200, so that the support sheets 260 can be lifted to stand on the first front surface 210 of the keyboard device 200 (as shown in FIG. 1), or the support sheets 260 can be flatly disposed on the first front surface 210 of the keyboard device 200 (as shown in FIG. 3A). In addition, each of the support sheets 260 is respectively and slidably engaged on the corresponding slide rail 350.

Thus, by the slide rails 350 being engaged with the support sheets 260, the tablet computer 300 reciprocally slides relative to the keyboard device 200. When the keyboard module 250 of the lower member is completely exposed, the support sheets 260 can be lifted to drive the tablet computer 300 to stand on the first front surface 210 of the keyboard device 200.

Referring to FIG. 1, when the tablet computer 300 slides towards the first rear side 240 of the keyboard device 200 till the keyboard module 250 of the lower member is completely exposed by the tablet computer 300, by lifting the support sheets 260 and the tablet computer 300, the tablet computer 300 is enabled to stand on the first front surface 210 of the keyboard device 200, so as to form an included angle θ between the second rear surface 320 of the tablet computer 300 and the first front surface 210 of the keyboard device 200, at this moment, the portable electronic device 100 is defined as in a keyboard mode.

On other hand, when the tablet computer 300 is flatly disposed on the keyboard device 200, and the first front side 230 of the keyboard device 200 is aligned with the second front side 330 of the tablet computer 300, the second rear surface 320 of the tablet computer 300 faces the first front surface 210 of the keyboard device 200, and the tablet computer 300 completely covers the keyboard module 250, at this moment, the portable electronic device 100 is defined as in a screen mode (as shown in FIG. 3A).

It is noted that the disclosure about how the tablet computer 300 standing on the keyboard device 200 is only an example for illustration, the present disclosure is not limited to how the tablet computer 300 standing on the keyboard device 200, the strip-storing unit 400 provided by the present disclosure can be adopted as long as the tablet computer 300 can slide relative to the keyboard device 200 for allowing the keyboard module 250 to be exposed or covered.

Figure 2:
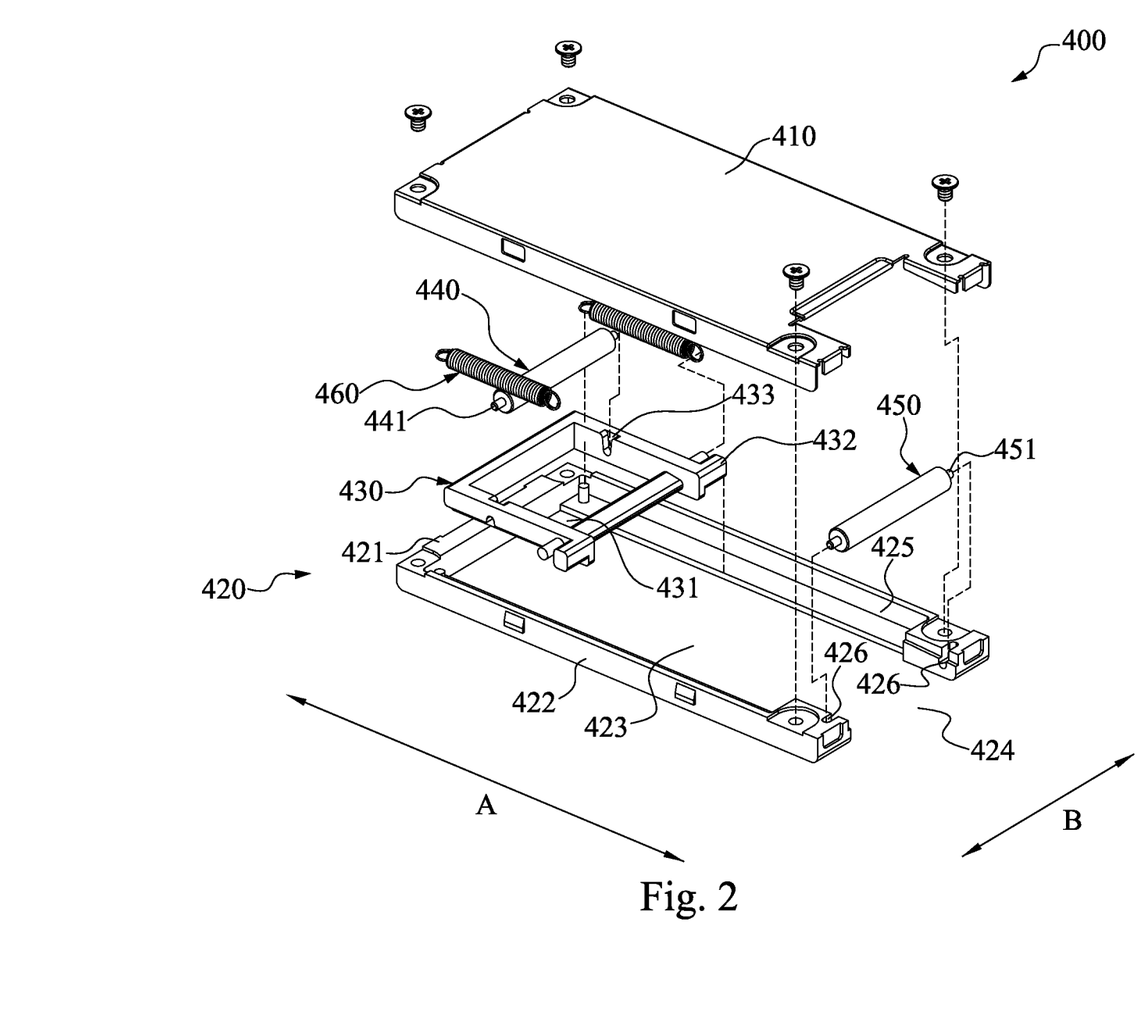
FIG. 2 is an exploded view showing the strip-storing unit of the portable electronic device according to a first alternative of this embodiment.

Reference is now made to FIG. 1 and FIG. 2. FIG. 2 is an exploded view showing the strip-storing unit 400 of the portable electronic device 100 according to a first alternative of this embodiment.

The strip-storing unit 400 is disposed in the keyboard device 200 and is adjacent to the first rear side 240 of the keyboard device 200; however, the present disclosure is not limited to the arrangement disclosed above.

Substantially, the strip-storing unit 400 includes a cover 410, a U-shaped fixed frame 420, a moving frame 430, a first moving roller 440, a direction-guiding roller 450, and one or more elastic members. The U-shaped fixed frame 420 is fixedly disposed in the keyboard device 200, e.g., being fastened and locked on an inner wall of the keyboard device 200. The U-shaped fixed frame 420 includes a first frame piece 421 and two second frame pieces 422. The two second frame pieces 422 are symmetrical to each other and disposed at two opposite ends of the first frame piece 421, and extended towards a long axle direction A. The long axle direction A is the same as the sliding direction in which the tablet computer 300 slides on the keyboard device 200. An elongated slot 423 is defined by the first frame piece 421 and the two second frame pieces 422, the elongated slot 423 is extended towards the long axle direction A. The location defined between the distal ends of the two second frame pieces 422 away from the first frame piece 421 and corresponding to the elongated slot 423 is defined as a slot opening 424 of the elongated slot 423. The U-shaped fixed frame 420 includes two slide grooves 425 and two first recessed slots 426. The slide grooves 425 are respectively and symmetrically formed on the two second frame pieces 422, and extended towards the long axle direction A, and in communication with the elongated slot 423. The two first recessed slots 426 are respectively formed on the two second frame pieces 422, and aligned with each other, and mutually facing the slot opening 424 of the elongated slot 423.

The moving frame 430 is slidably disposed in the elongated slot 423 for moving reciprocally, so the moving frame 430 reciprocally moves in the elongated slot 423 along the long axle direction A. The moving frame 430 includes an opening 431 and two sliding protrusions 432. The opening 431 is surrounded by the moving frame 430. The sliding protrusions 432 are respectively and symmetrically disposed at two opposite outer sides of the moving frame 430, and respectively and moveably disposed on the slide grooves 425 for providing support and allowing the moving frame 430 to reciprocally move in the elongated slot 423. The moving frame 430 is formed with two second recessed slots 433 at two opposite inner sides of the opening 431. The two second recessed slots 433 are respectively faced the opening 431 and aligned with each other.

The direction-guiding roller 450 is pivoted on the U-shaped fixed frame 420, and disposed at the slot opening 424 of the elongated slot 423, the roller axle direction B is perpendicular to the long axle direction A. For instance, two opposite ends of the direction-guiding roller 450 are respectively extended with an axle end 451, the two axle ends 451 are respectively disposed in the two first recessed slots 426, so that the direction-guiding roller 450 can be freely rotated in the U-shaped fixed frame 420. The direction-guiding roller 450 is capable of guiding the direction in which the electric connecting strip 500 enters the elongated slot 423.

The first moving roller 440 is pivoted on the moving frame 430 and crosses the opening 431, the roller axle direction B is perpendicular to the long axle direction A. For example, two opposite ends of the first moving roller 440 are respectively extended with an axle end 441, the two axle ends 441 are respectively disposed in the two second recessed slots 433, so that the first moving roller 440 can be freely rotated in the moving frame 430.

As shown in FIG. 2, according to the first alternative of this embodiment, the elastic member mentioned above is one or more (e.g., two) tension springs 460 (as shown in FIG. 2). The tension springs 460 are respectively disposed in the two slide grooves 425, two opposite ends thereof are respectively connected to the moving frame 430 and the U-shaped fixed frame 420.

As shown in FIG. 1 and FIG. 3A. FIG. 3A is a partially side view showing the portable electronic device 100 being in a screen mode according to the first alternative of this embodiment.

The electric connecting strip 500, for example, is a flexible printed circuit (FPC) or a flexible flat cable (FFC). One end of the electric connecting strip 500 penetrates into the tablet computer 300 through the second rear surface 320 of the tablet computer 300, and electrically connected to a printed circuit board (not shown in figures) installed inside the tablet computer 300 through an electric connecting member 510, the other end of the electric connecting strip 500 penetrates into the keyboard device 200 through the first front surface 210 of the keyboard device 200, and electrically connected to a printed circuit board 270 installed inside the keyboard device 200 through an electric connecting member 520.

The electric connecting strip 500 is guided by the direction-guiding roller 450 for entering the elongated slot 423, and then the electric connecting strip 500 reaches to the first moving roller 440 at the opening 431 in the elongated slot 423. After that, the electric connecting strip 500 passes through the opening 431 in a D1 direction defined from up to down, circles around the first moving roller 440, then, the electric connecting strip 500 is connected to the printed circuit board 270; after being connected to the printed circuit board 270, the electric connecting strip 500 is straightly stretched by the first moving roller 440, so that a part (e.g., a major part thereof) of the electric connecting strip 500 can be stored in the elongated slot 423 with an evenly folding means.

As shown in FIG. 1 and FIG. 2, the cover 410 covers the U-shaped fixed frame 420 and the elongated slot 423, so as to fasten and lock the U-shaped fixed frame 420 on an inner wall of the keyboard device 200 corresponding to the first front surface 210. In addition, the cover 410 covers the first recessed slots 426 of the U-shaped fixed frame 420 and the second recessed slots 433 of the moving frame 430, so as to prevent the axle ends 441 of the first moving roller 440 and the axle ends 451 of the direction-guiding roller 450 from being released from the second recessed slots 433 and the first recessed slots 426.

Accordingly, as shown in FIG. 1, FIG. 2 and FIG. 3A, when the portable electronic device 100 is switched to the screen mode from the keyboard mode, i.e., the tablet computer 300 slides relative to the keyboard device 200 along the lone axle direction A for covering the keyboard module 250, because the other end of the electric connecting strip 500 is fastened in the keyboard device 200, while being driven by the tablet computer 300, the portion of the electric connecting strip 500 circling around the first moving roller 440 drives the first moving roller 440 at the same time, so a part having a certain length of the electric connecting strip 500 is pulled out of the elongated slot 423, meanwhile the moving frame 430 is driven by the electric connecting strip 500 along the lone axle direction A to the slot opening 424 of the elongated slot 423, thereby causing the tension spring 460 to be stretched and deformed.

Figure 3B:
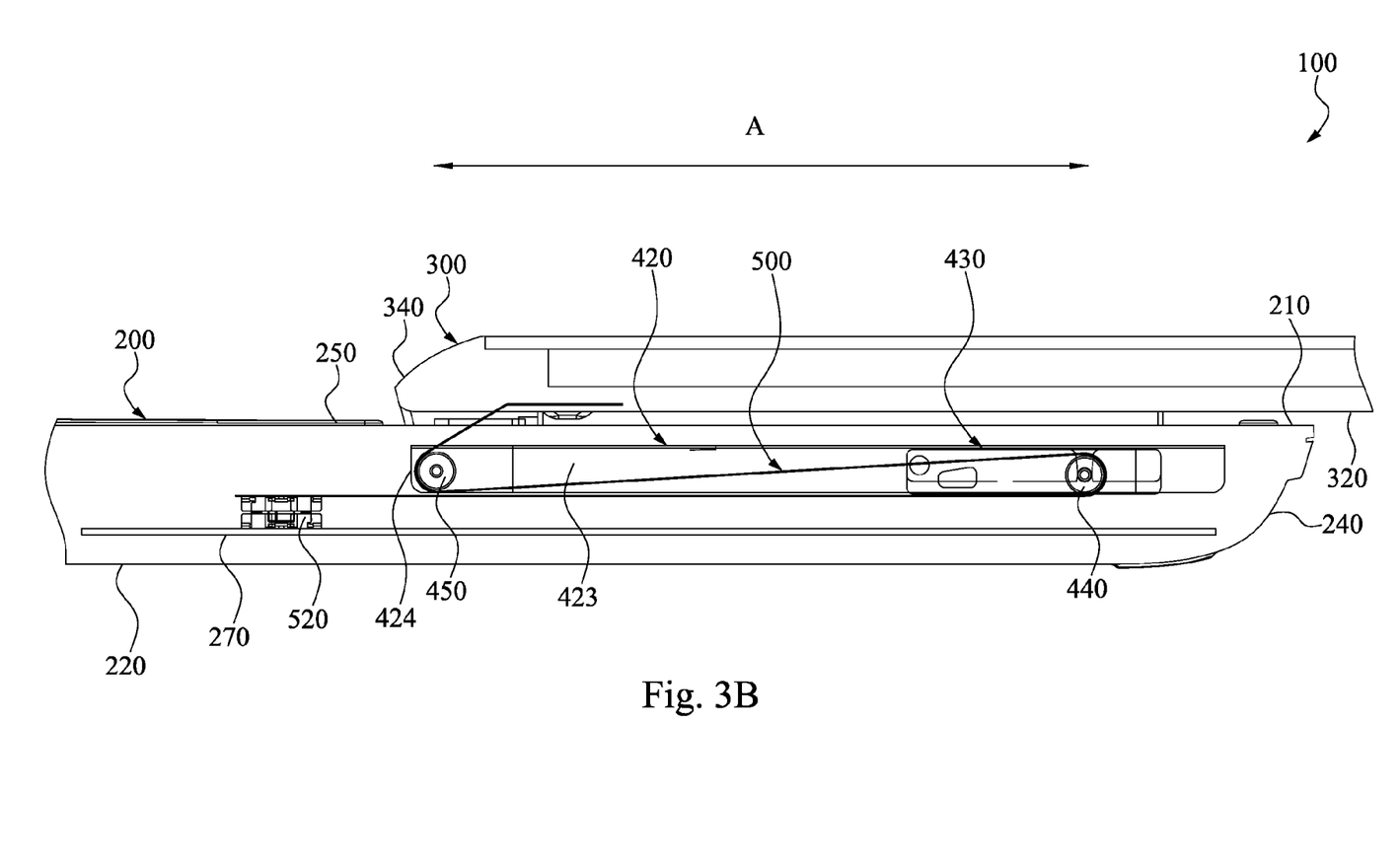
FIG. 3B is a partial side view showing the portable electronic device being in a keyboard mode according to the first alternative of this embodiment.

On the other hand, FIG. 3B is a partial side view showing the portable electronic device 100 being in a keyboard mode according to the first alternative of this embodiment.

as shown in FIG. 1, FIG. 2 and FIG. 3B. When the portable electronic device 100 is switched to the keyboard mode from the screen mode, i.e., the tablet computer 300 slides relative to the keyboard device 200 along the lone axle direction A for exposing the keyboard module 250, because the electric connecting strip 500 is no longer pulled by the tablet computer 300, the tension spring 460 is recovered for pulling the moving frame 430, the first moving roller 440 and the electric connecting strip 500 to at a location inside the elongated slot 423 being apart from the slot opening 424, such that the part of the electric connecting strip 500 is pulled back into the elongated slot 423 (i.e., the keyboard device 200) so that the electric connecting strip 500 can not be exposed outside the portable electronic device 100.

Figure 4:
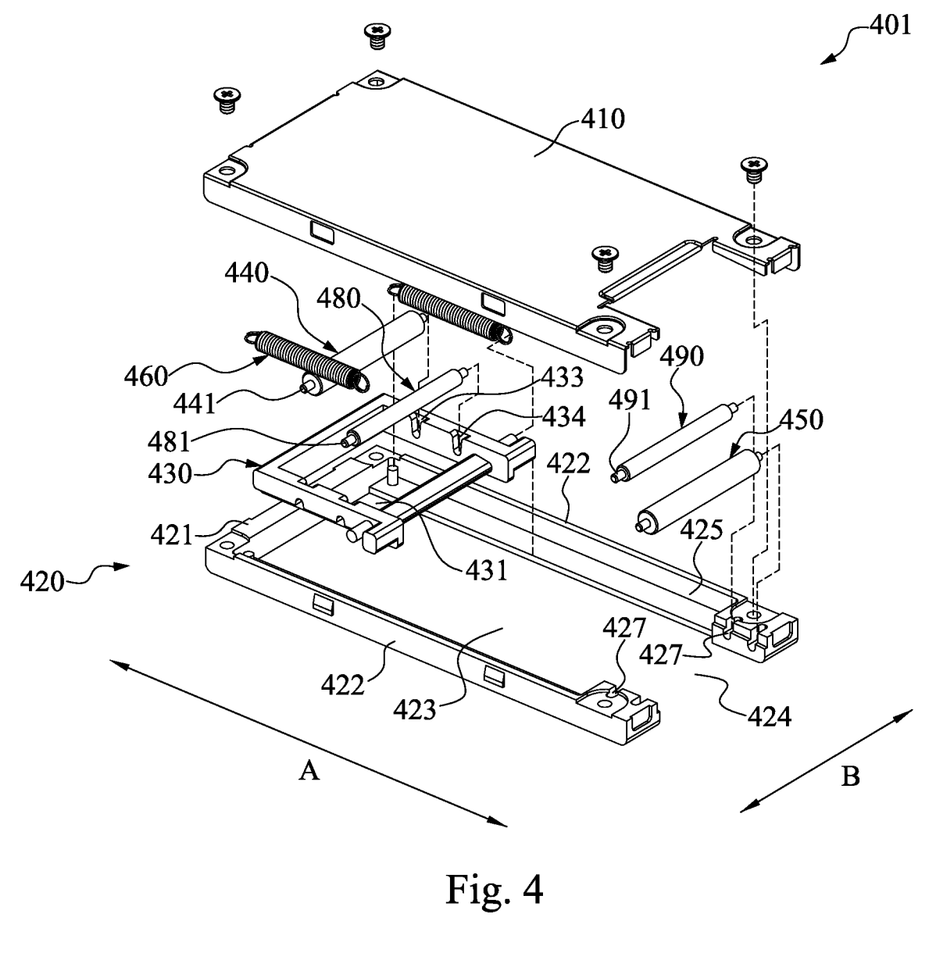
FIG. 4 is an exploded view showing the strip-storing unit of the portable electronic device according to a second alternative of this embodiment.

Reference is now made to FIG. 1 to FIG. 4. FIG. 4 is an exploded view showing the strip-storing unit 400 of the portable electronic device 100 according to a second alternative of this embodiment.

According the second alternative of this embodiment, a strip-storing unit 401 disclosed in the second alternative is substantially the same as the strip-storing unit 400 disclosed in FIG. 2, the difference is as followings.

The U-shaped fixed frame 420 further includes two third recessed slots 427, the two third recessed slots 427 are respectively disposed on the two second frame pieces 422 and mutually aligned with each other, and facing the slot opening 424 of the elongated slot 423. Each of the third recessed slots 427 is formed between the first recessed slot 426 and the slide groove 425. The moving frame 430 is formed with two fourth recessed slots 434 corresponding to two opposite inner sides of the opening 431. The two fourth recessed slots 434 are respectively faced the opening 431 and aligned with each other.

The strip-storing unit 401 further includes a second moving roller 480 and a third moving roller 490. The second moving roller 480 is pivoted on the moving frame 430 and crosses the opening 431, the axle direction of the second moving roller 480 is in parallel with the roller axle direction B of the first moving roller 440. For instance, two opposite ends of the second moving roller 480 are respectively extended with an axle end 481, the two axle ends 481 are respectively disposed in the two fourth recessed slots 434, so that the second moving roller 480 can be freely rotated in the moving frame 430.

The third moving roller 490 is pivoted on the U-shaped fixed frame 420 and is adjacent to the direction-guiding roller 450, the axle direction of the third moving roller 490 is in parallel with the axle direction of the first moving roller 440; for example, two opposite ends of the third moving roller 490 are respectively extended with an axle end 491, the two axle ends 491 are respectively disposed in the two third recessed slots 427, so that the third moving roller 490 can be freely rotated in the U-shaped fixed frame 420, as shown in FIG. 4, the third moving roller 490 and the direction-guiding roller 450 are both disposed in the slot opening 424 of the elongated slot 423.

Figure 5A:
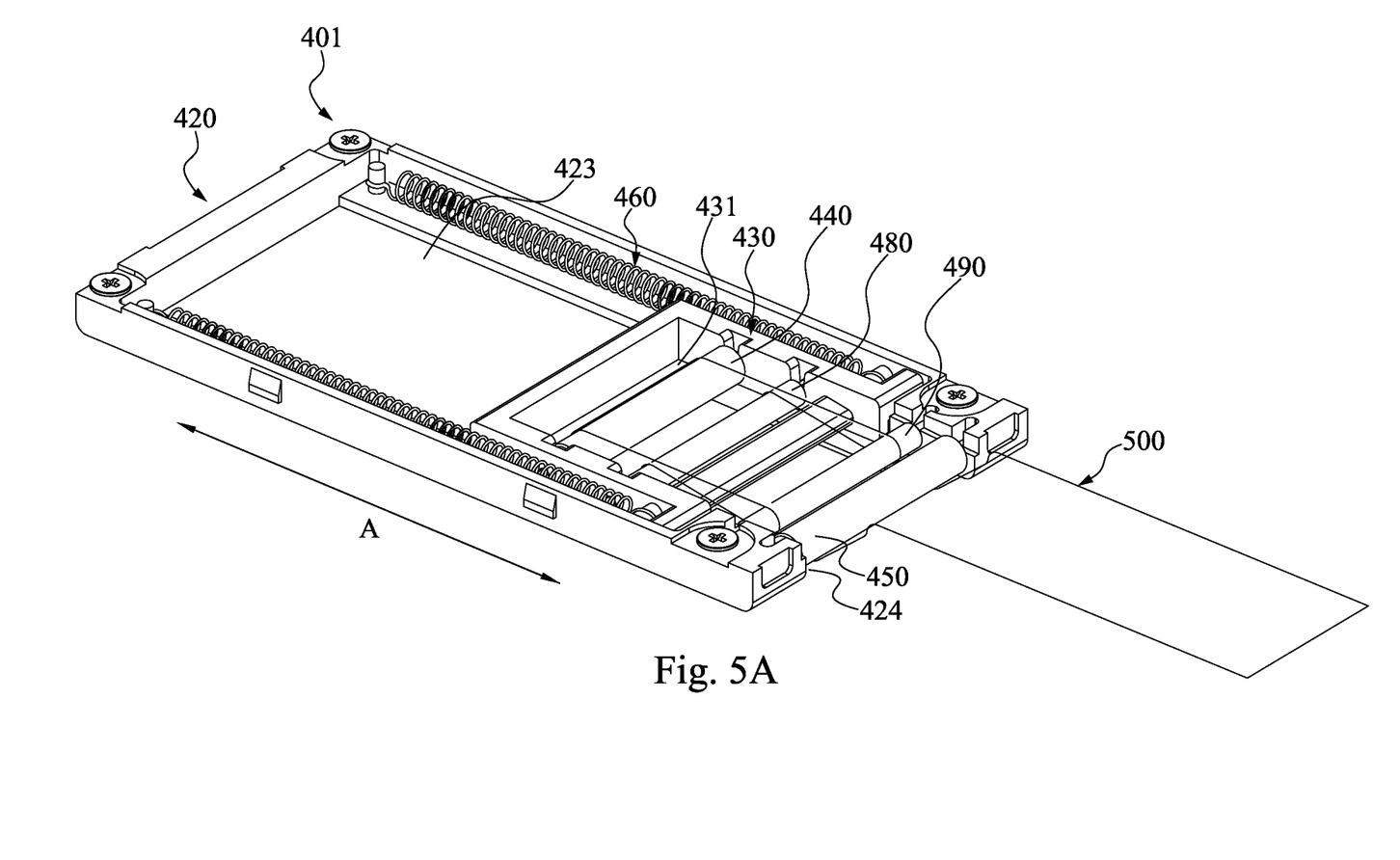
FIG. 5A is a schematic view illustrating the relation of the electric connecting strip and the strip-storing unit while the portable electronic device being in the screen mode according to the second alternative of this embodiment.
Figure 5B:
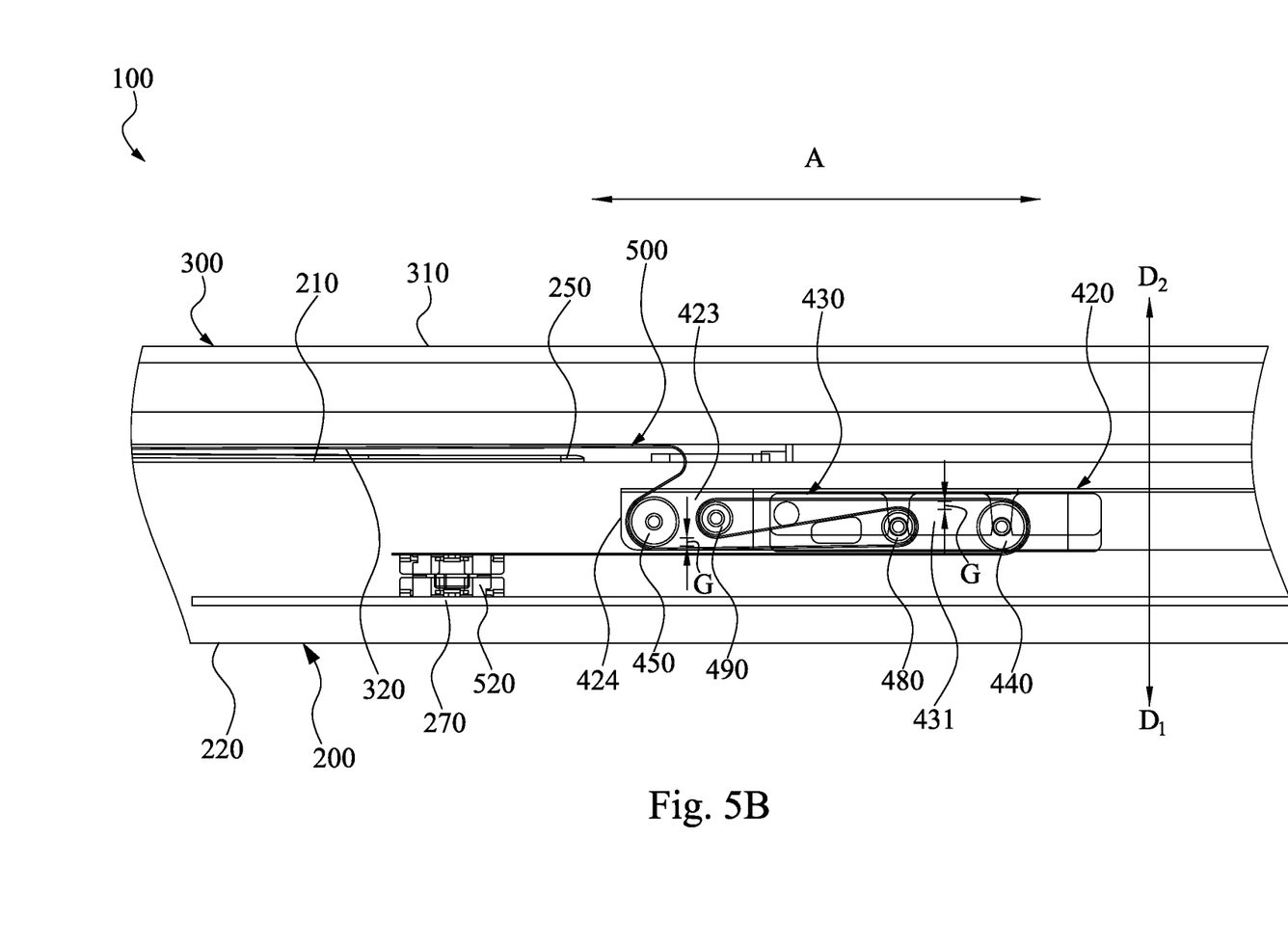
FIG. 5B is a partial side view showing the portable electronic device being in the screen mode according to the second alternative of this embodiment.

Reference is now made to FIG. 1, FIG. 5A and FIG. 5B. FIG. 5A is a schematic view illustrating the relation of the electric connecting strip 500 and the strip-storing unit 401 while the portable electronic device 100 being in the screen mode according to the second alternative of this embodiment; and FIG. 5B is a partial side view showing the portable electronic device 100 being in the screen mode according to the second alternative of this embodiment.

One end of the electric connecting strip 500 is electrically connected to a printed circuit board installed inside the tablet computer 300, the other end of the electric connecting strip 500 is electrically connected to a printed circuit board 270 installed inside the keyboard device 200. After the electric connecting strip 500 is guided by the direction-guiding roller 450 for entering the elongated slot 423, and the electric connecting strip 500 reaches to the second moving roller 480, then passes the opening 431 along a D2 direction defined from down to up, then circles around the second moving roller 480, then the electric connecting strip 500 reaches to the third moving roller 490 and circles around the third moving roller 490, in which the electric connecting strip 500 is straightly stretched by the second moving roller 480 and the third moving roller 490. Afterward, the electric connecting trip 500 is guided to the first moving roller 440 and passes the opening 431 along the D1 direction defined from up to down, and circles around the first moving roller 440, then, the electric connecting trip 500 is connected to the printed circuit board 270, and after connecting to the electric circuit board 270, the electric connecting strip 500 is straightly stretched by the first moving roller 440 so that the part of the electric connecting strip 500 is stored in the elongated slot 423 and folded for multiple times.

Because the part of the electric connecting strip 500 is stored in the elongated slot 423 by folding for multiple times, even if the elongated slot 423 (i.e., the strip-storing unit 401) is shortened, the elongated slot 423 (i.e., the strip-storing unit 401) is still capable of storing the same length of the electric connecting strip 500 in FIG. 3A.

Moreover, the outer diameter of the third moving roller 490 is smaller than the outer diameter of the direction-guiding roller 450, so a gap G is kept between the portion of the electric connecting strip 50 circling around the direction-guiding roller 450 and the portion of the electric connecting strip 500 circling around the third moving roller 490, so as to prevent from being in contact with the portion of the electric connecting strip 50 circling around the third moving roller 490, so as to avoid friction.

Because the outer diameter of the second moving roller 480 is smaller than the outer diameter of the first moving roller 440, so a gap G is kept between the portion of the electric connecting strip 500 circling around the first moving roller 440 then protruding to the third moving roller 490 and the portion of the electric connecting strip 500 circling around the second moving roller 480 then protruding to the third connecting roller 490, so as to prevent from being in contact with the portion of the electric connecting strip 500 reaching to the third moving roller 490 after circling around the second moving roller 480, so as to avoid friction.

As shown in FIG. 1, FIG. 4 and FIG. 5B, when the portable electronic device 100 is switched to the screen mode according to the second alternative, in other words, the tablet computer 300 slides relative to the keyboard device 200 along the long axle direction A for covering the keyboard module 250, because the other end of the electric connecting strip 500 is fastened in the keyboard device 200, so when the electric connecting strip 500 is pulled by the tablet computer 300, the portion of electric connecting strip 500 respectively circling around the second moving roller 480, the third moving roller 490 and the first moving roller 440 pulls both the first moving roller 440 and the second moving roller 480 simultaneously, so that a part of the electric connecting strip 500 is pulled out of the elongated slot 423, meanwhile, the moving frame 430 is moved by the electric connecting strip 500 along the long axle direction A to the slot opening 424 of the elongated slot 423, thus, the tension spring 460 is then stretched and deformed.

Figure 6A:
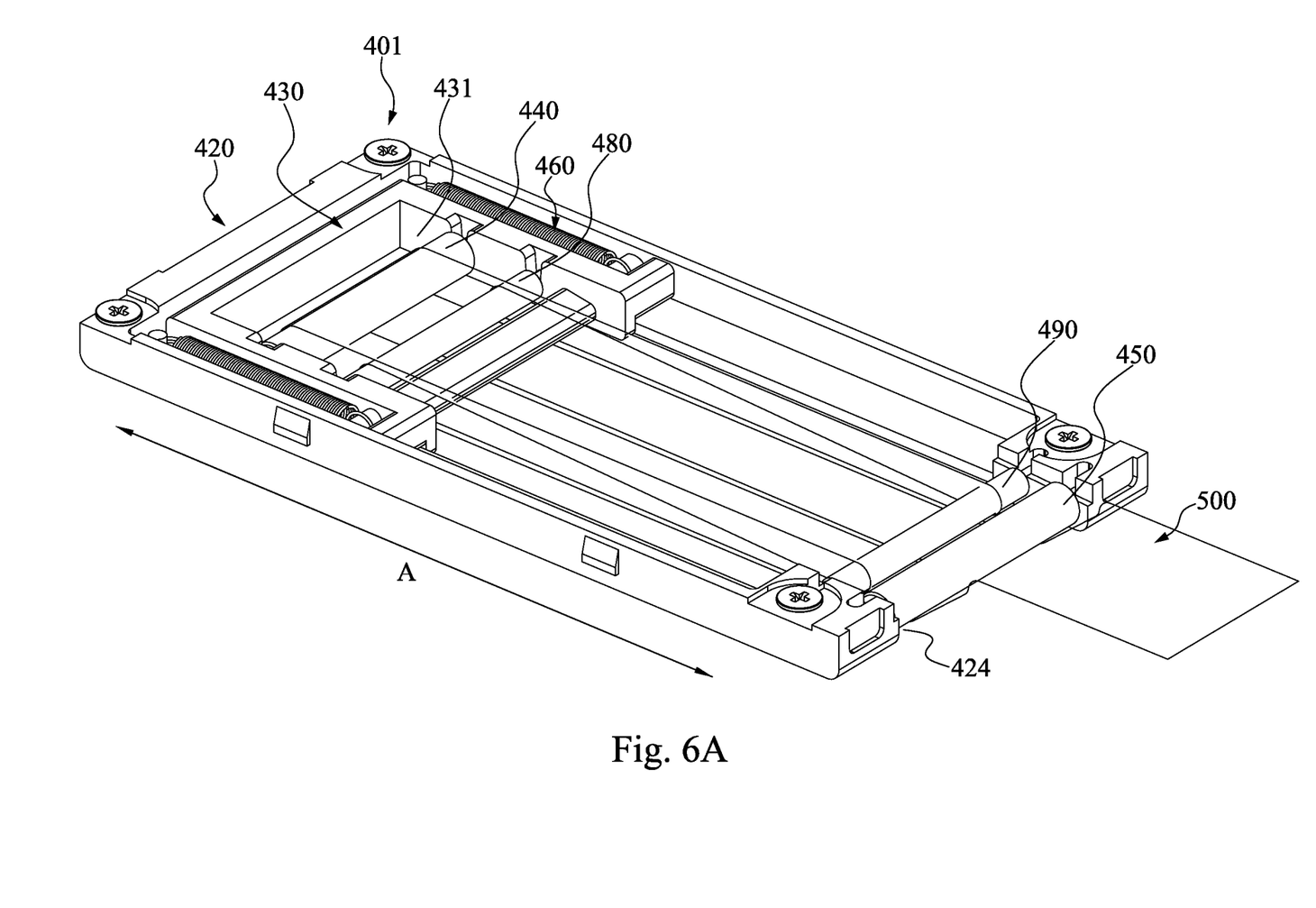
FIG. 6A is a schematic view illustrating the relation of the electric connecting strip and the strip-storing unit while the portable electronic device being in the keyboard mode according to the second alternative of this embodiment.
Figure 6B:
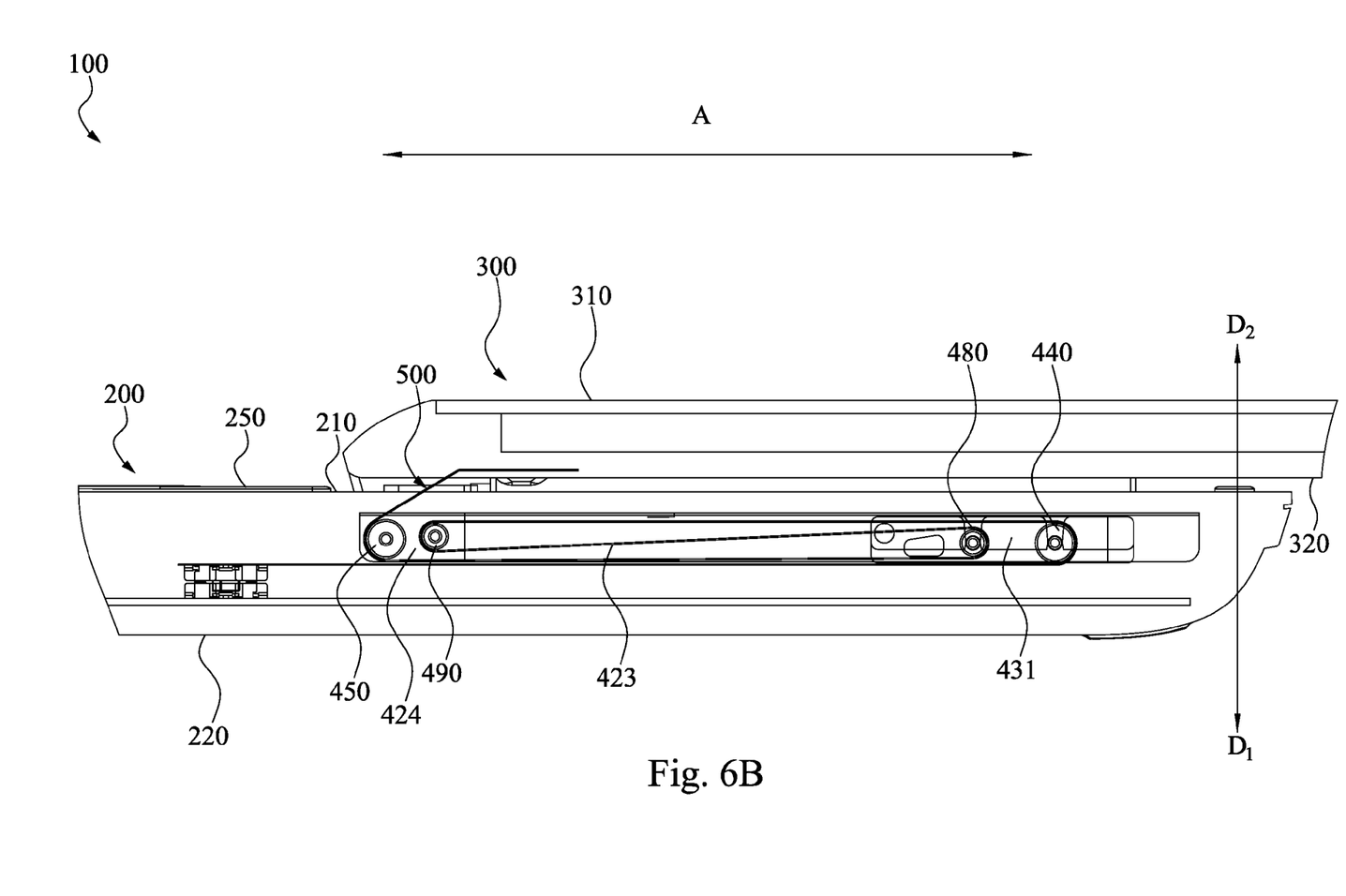
FIG. 6B is a partial side view showing the portable electronic device being in the keyboard mode according to the second alternative of this embodiment.

Reference is now made to FIG. 4, FIG. 6A and FIG. 6B. FIG. 6A is a schematic view illustrating the relation of the electric connecting strip 500 and the strip-storing unit 401 while the portable electronic device 100 being in the keyboard mode according to the second alternative of this embodiment, and FIG. 6B is a partial side view showing the portable electronic device 100 being in the keyboard mode according to the second alternative of this embodiment.

When the portable electronic device 100 is switched to the keyboard mode from the screen mode, in other words, the tablet computer 300 slides relative to the keyboard device 200 along the long axle direction A for exposing the keyboard module 250, because the electric connecting trip 500 is no longer pulled the tablet computer 300, the tension spring 460 is recovered for pulling the moving frame 430, the first moving roller 440 and the second moving roller 480 to a location inside the elongated slot 423 and being apart from the slot opening 424, such that the part of the electric connecting strip 500 is pulled back into the elongated slot 423 (i.e., the keyboard device 200) thereby not being exposed outside the portable electronic device 100.

Meanwhile, because the time required by the driven electric connecting strip 500 circling around the second moving roller 480, the third moving roller 490 and the first moving roller 440 is slower than the recovering time of the tension spring 460, so the force provided to the electric connecting strip 500 to against the tension spring 460 is increased, the force of pulling the moving frame 430 can also be buffered, so as to protect and prolong the service life of the moving frame 430 and the tension spring 460.

Figure 7:
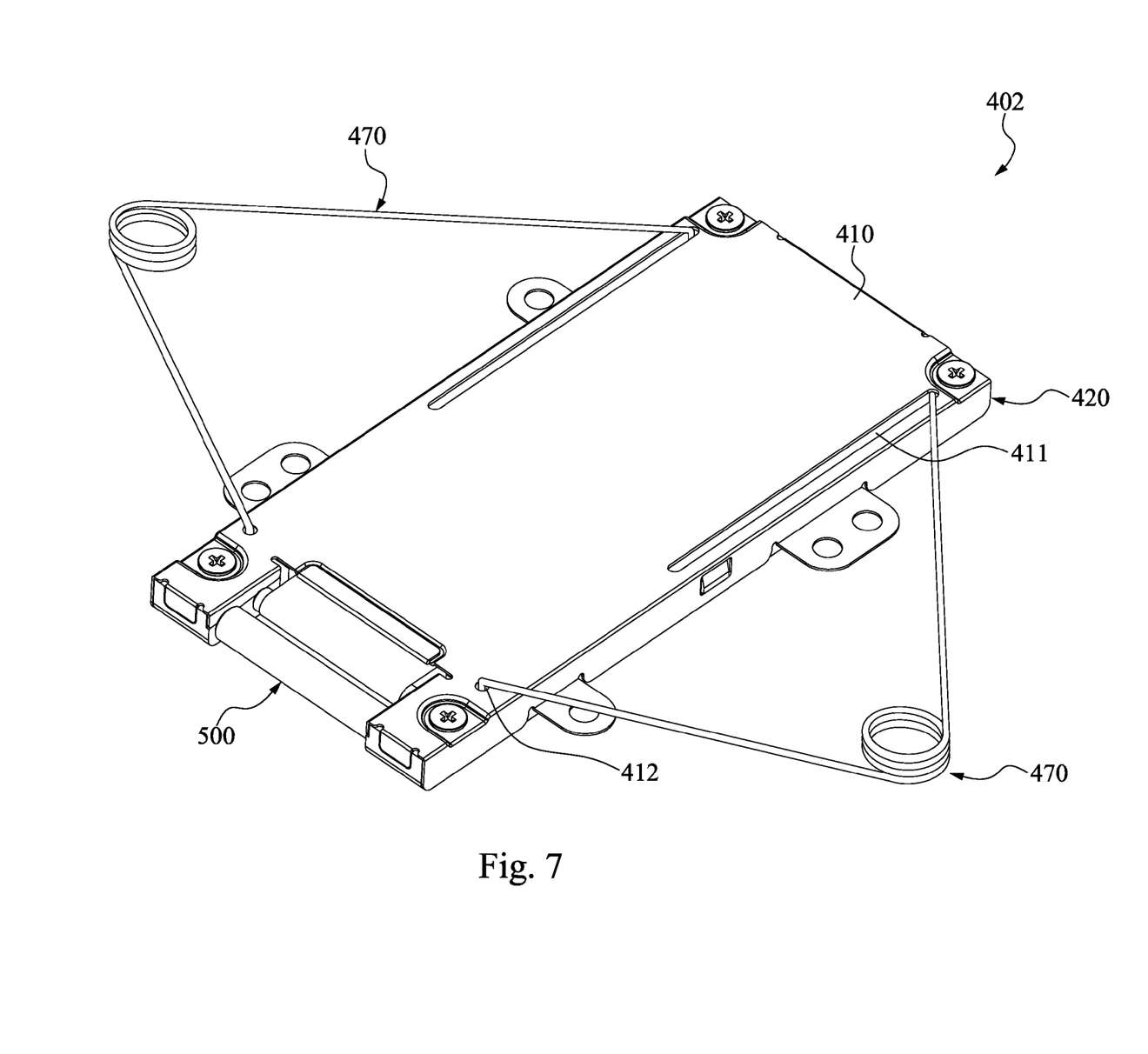
FIG. 7 is a schematic view showing the appearance of the strip-storing unit of the portable electronic device, according to a third alternative of this embodiment.

FIG. 7 is a schematic view showing the appearance of the strip-storing unit 402 of the portable electronic device 100 according to a third alternative of this embodiment.

According to the third alternative of this embodiment, the elastic member is one or more (e.g., two) torsion springs 470. The torsion springs 470 are respectively disposed at two opposite outer sides of the U-shaped fixed frame 420, one end thereof passes a linear slot 411 of the cover 410 and connects to the moving frame 430, the other end passes an opening 412 of the cover 410 and connects to the U-shaped fixed frame 420.

As shown in FIG. 3A and FIG. 7, when the tablet computer 300 slides relative to the keyboard device 200 for covering the keyboard module 250, the moving frame 430 is driven to the slot opening 424 of the elongated slot 423, so one end of the torsion spring 470 is moved towards the other end along the linear slot 411, thereby causing the torsion spring 470 to be compressed and deformed. On the other hand, as shown in FIG. 3B and FIG. 7, when the tablet computer 300 slides relative to the keyboard device 200 for exposing the keyboard module 250, one end of the torsion spring 470 is moved away from the other end along the linear slot 411 thereby being recovered.

It is noted that during the deformation of the tension spring 460, the provided elasticity is varied by time, so the torsion spring 470 provides the elasticity which is more evenly comparing to the elasticity of the tension spring 460, thereby enabling the electric connecting strip 500 to be more smoothly pulled in or out of the strip-storing unit 401.

Figure 8:
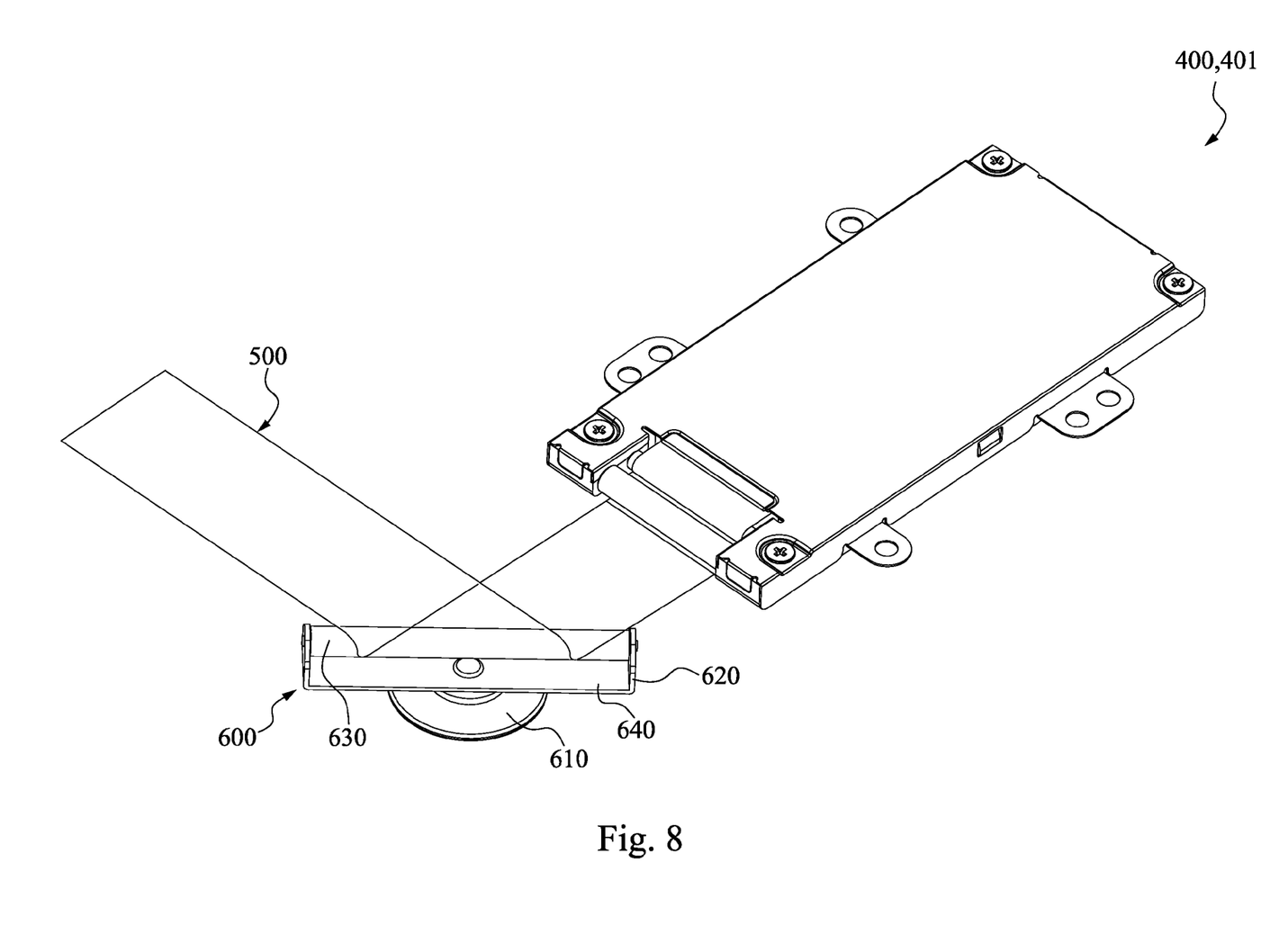
FIG. 8 is a schematic view showing the strip-storing unit of the portable electronic device according to another embodiment of the present disclosure.

Reference is now made to FIG. 3A and FIG. 8. FIG. 8 is a schematic view showing the strip-storing unit 401 of the portable electronic device 100 according to another embodiment of the present disclosure.

Because the lower member (e.g., the keyboard device 200) has limited internal space, the strip-storing unit 400, 401 in the lower member (e.g., the keyboard device 200) is unable to be oriented to the keyboard module 250, that is, the extending direction of the strip-storing unit 400, 401 is not towards the long axle direction A, according to the another embodiment, the portable electronic device 100 further includes a turning part 600 installed in the lower member (e.g., the keyboard device 200). The turning part 600 includes a base 601, a U-shaped rack 620 and a rotation shaft 630. The base 610 is fastened in the lower member, e.g., fastened and locked inside the keyboard device 200. The U-shaped rack 620 is pivoted on the base 610, and includes a notch 640 facing the upper member (e.g., the tablet computer 300). The rotation shaft 630 is transversally disposed in the notch 640, and a slit is defined between the rotation shaft 630 and the U-shaped rack 620.

Thus, the electric connecting strip 500 passes the slit and circles around the rotation shaft 630, and through the pivotal rotation of the U-shaped rack 620, the extending direction of the electric connecting strip 500 can be altered for being electrically connected to the printed circuit board installed in the upper member (e.g., the tablet computer 300) or the lower member (e.g., the keyboard device 200).

As what has been disclosed above, with the portable electric device provided by the present disclosure, when the upper member slides relative to the lower member, a part of the electric connecting strip used for connecting the upper member and the lower member is hidden in the portable electronic device, thereby being prevented from being exposed outside the portable electronic device, so the whole appearance can be prettified, and the possibility of the electric connecting strip being damaged can be lowered, the willingness of purchasing and using the portable electronic device is also increased.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electronic device, comprising:
    a lower member having a keyboard module being adjacent to one side of the lower member;
    an upper member slidably disposed on the lower member, and comprising a screen;
    a strip-storing unit disposed in the lower member, and being adjacent to the other side of the lower member, the strip-storing unit comprising:
        a U-shaped fixed frame fixedly disposed in the lower member, an elongated slot having a long axle direction being defined in the U-shaped fixed frame, the U-shaped fixed frame having a direction-guiding roller pivoted on the U-shaped fixed frame, and being disposed at a slot opening of the elongated slot, for guiding towards the direction that the electric connecting strip enters the elongated slot;
        a moving frame reciprocally moving in the elongated slot, an opening being surrounded by the moving frame;
        a first moving roller pivoted on the moving frame and crossing the opening, and an axle direction of the first moving roller being parallel with an axle direction of the direction-guiding roller, and perpendicular to the long axle direction of the U-shaped fixed frame, the electric connecting strip passing through the opening and circling around the first moving roller, and being stretched straightly by the first moving roller; and
        at least one elastic member connecting the U-shaped fixed frame and the moving frame; and
    an electric connecting strip retractably stored in the strip-storing unit, and two ends thereof being respectively connected to the upper member and the lower member,
    wherein, when the upper member slides for covering the keyboard module, the electric connecting strip is driven by the upper member for pulling the first moving roller, so the moving frame is moved to the slot opening of the elongated slot in the long axle direction, a part of the electric connecting strip is pulled out of the elongated slot of the U-shaped fixed frame, and the at least one elastic member is deformed,
    wherein, when the upper member slides for exposing the keyboard module, the at least one elastic member is recovered for pulling the moving frame, the first moving roller and the electric connecting strip apart from the slot opening of the elongated slot, so the part of the electric connecting strip is pulled back into the elongated slot of the U-shaped fixed frame.

2. The portable electronic device according to claim 1, wherein the U-shaped fixed frame comprises two slide grooves, the slide grooves are respectively and symmetrically formed on the U-shaped fixed frame and in communication with the elongated slot; and the moving frame comprises two sliding protrusions, the sliding protrusions are respectively and symmetrically disposed at two opposite outer sides of the moving frame, and respectively disposed on the slide grooves and capable of reciprocally moving thereon.

3. The portable electronic device according to claim 2, wherein when the quantity of the at least one elastic member is two, the two elastic members are symmetrically disposed at two opposite outer sides of the moving frame.

4. The portable electronic device according to claim 3, wherein each of the two elastic members is a tension spring, the torsion springs are respectively disposed in the slide grooves.

5. The portable electronic device according to claim 3, wherein each of the two elastic members is a torsion spring, the torsion springs are disposed outside the elongated slot.

6. The portable electronic device according to claim 1, wherein the strip-storing unit further comprises:

a second moving roller pivoted on the moving frame and crossing the opening, an axle direction of the second moving roller is parallel with the axle direction of the first moving roller; and a third moving roller pivoted on the U-shaped fixed frame and disposed close to the direction-guiding roller, an axle direction the third moving roller is parallel with the axle direction of the first moving roller, wherein, after the electric connecting strip is guided by the direction-guiding roller to the second moving roller, the electric connecting strip in sequence circles around the second moving roller and the third moving roller, and is straightly stretched by the second moving roller and the third moving roller, then guided to the first moving roller, so as to fold the electric connecting strip for multiple times.

7. The portable electronic device according to claim 6, wherein an outer diameter of at least one of the second moving roller and the third moving roller is larger than an outer diameter of the first moving roller.

8. The portable electronic device according to claim 1, further comprising:

a turning part comprising:
a base fastened in the lower member;
a U-shaped rack pivoted on the base and comprising a notch facing the upper member; and
a rotation shaft transversally disposed in the notch, and a slit is defined between the rotation shaft and the U-shaped rack,
wherein the electric connecting strip passes the slit and circles around the rotation shaft, and the extending direction of the electric connecting strip is altered through the pivotal rotation of the U-shaped rack.

* * * * *